United States Patent [19]

Canderle

[11] Patent Number: 5,560,442
[45] Date of Patent: Oct. 1, 1996

[54] ELECTRICALLY MOTORIZED WHEEL, PARTICULARLY FOR BICYCLES, WITH INCORPORATED MECHANICAL GEAR CHANGE

[76] Inventor: Giampietro Canderle, Via Cazzale 29/30, I-36057 Arcugnano (VI), Italy

[21] Appl. No.: 190,161

[22] PCT Filed: Aug. 10, 1992

[86] PCT No.: PCT/EP92/01824

§ 371 Date: Jun. 15, 1994

§ 102(e) Date: Jun. 15, 1994

[87] PCT Pub. No.: WO93/03956

PCT Pub. Date: Mar. 4, 1993

[30] Foreign Application Priority Data

Aug. 23, 1991 [IT] Italy ................. MI91A2282

[51] Int. Cl.⁶ .................. B60K 1/00; B60K 7/00; B60K 25/08
[52] U.S. Cl. .............. 180/65.5; 180/65.6; 180/221
[58] Field of Search .................. 180/65.5, 65.6, 180/65.7, 221; 310/67 R, 67 A

[56] References Cited

U.S. PATENT DOCUMENTS

| | | | |
|---|---|---|---|
| 1,010,111 | 11/1911 | Baker | 180/65.5 |
| 1,090,684 | 3/1914 | Church | 180/65.5 |
| 1,155,123 | 9/1915 | Barton | 180/65.5 |
| 1,321,898 | 11/1919 | Dey | 180/65.5 |
| 3,517,574 | 6/1970 | Glatfelter | |
| 4,481,841 | 11/1984 | Abthoff et al. | 180/69.6 |

FOREIGN PATENT DOCUMENTS

| | | |
|---|---|---|
| 0396073 | 11/1990 | European Pat. Off. . |
| 2377930 | 1/1978 | France . |
| 1286362 | 2/1969 | Germany . |
| 3024398A1 | 6/1980 | Germany . |
| WO88/10379 | 12/1988 | Germany . |
| 282712 | 8/1962 | Netherlands . |

OTHER PUBLICATIONS

Disegno Di Macchine, Mario Speluzzi, Mario Tessarotto, 1963, pp. 416–418.

*Primary Examiner*—Brian L. Johnson
*Attorney, Agent, or Firm*—Watson Cole Stevens Davis, P.L.L.C.

[57] ABSTRACT

An electrically motorized wheel, particularly useful for bicycles, has a hub with an electric motor housed therein. The motor is fixed with respect to the axis of rotation of the wheel and has a drive shaft perpendicular to the wheel axis which engages a crown wheel inside the hub through freewheel mechanisms and at least one gear reduction mechanism so that the motorized wheel may operate at two different gear ratios in one direction upon reversal of the motor direction and operate in a freewheeling mode when no power is supplied or when the bicyclist applies manual power.

13 Claims, 6 Drawing Sheets

VISTA A-A'

ELECTRICALLY MOTORIZED WHEEL, PARTICULARLY FOR BICYCLES, WITH INCORPORATED MECHANICAL GEAR CHANGE

BACKGROUND OF THE INVENTION

The present invention refers to a motorized wheel for light vehicles in general, and particularly for bicycles, which is provided with an electric motor and a mechanical two-ratio gear change, which ape housed in the hub of the said wheel.

Motorized wheel for bicycles are already known, and the electric motor housed in their hub is fed by a rechargable battery, fixed to the bicycle frame, which allows a certain degree of autonomy and which can be connected or disconnected by the user by manoeuvering a special control.

There is also a publication (DE-A-27 02 541) relating to a motorized wheel, in particular for a child's bicycle, which incorporates a gear change, comprising wheelworks end levers which can be moved by means of a wire, for transmitting the rotary movement of the driving shaft pinion to one of two crown gears of different diameters made in the wheel hub.

Such a system is far too complicated and expensive, and it is easily subject to breaking, because of the continual engaging and disengaging of the different gears during gear changing.

SUMMARY OF THE INVENTION

One aim of the present invention is to provide a motorized wheel of the above mentioned type, provided with a gear change, which will be simple and economical to produce, and will eliminate or at least greatly reduce risks of the motorized device breaking or not working, by maintaining the various gears in mesh.

Another aim of the invention is to provide a motorized wheel of the above type in which the gear shifting can take place automatically.

Yet another aim of the invention is to provide a motorized wheel of such type, which will allow the vehicle to be used with electric traction only or with muscular traction only, or with a combination of electric and muscular traction.

The motorized wheel according to the invention is substantially characterized in that the shaft of the electric motor has two ends which are opposed which respect to the axis of the wheel hub, each one being provided with a respective pinion in constant mesh with one or more concentric crown wheels foreseen on the wheel hub, and with different reduction ratios.

The movement is transmitted to the two pinions by means of respective free wheels, in such a way that each pinion is set in rotation only when the driving shaft rotates in the correct direction, while the other remains free.

Since the two pinions work with different reduction ratios, passing from one ratio to the other takes place simply by reversing the rotation of the driving shaft, which takes place immediately by inverting the feed polarity of the motor, by means of a commutator in the case of direct current, or by means of a motor inverter in the case of alternating current.

Such inversion can be made automatic by means of an electronic circuit on the basis of the current absorbed by the motor. When such current goes over a predetermined threshold it automatically reverses the rotation, connecting the higher reduction ratio and viceversa.

In a first embodiment of the invention, the different reduction ratios are obtained by using bevel pinions with different diameters, which engage with different concentric crown wheels at the same time.

In a second embodiment of the invention, at least one of the two pinions is connected to the driving shaft by means of an epicycloidal reduction gear, with the two pinions engaging preferably with the same crown wheel, in this case.

According to another embodiment of the invention, at least one of the two bevel pinions engages with a corresponding bevel gear, which in turn operates a crown gear mounted outside a freewheel and engages with the inner profile of the crown wheel.

BRIEF DESCRIPTION OF THE DRAWINGS

Further characteristics of the invention will be explained more clearly in the detailed description which follows, referring to unrestrictive exemplary embodiments thereof, illustrated in the appended drawings, in which.

DESCRIPTION OF THE INVENTION

Figure 1:
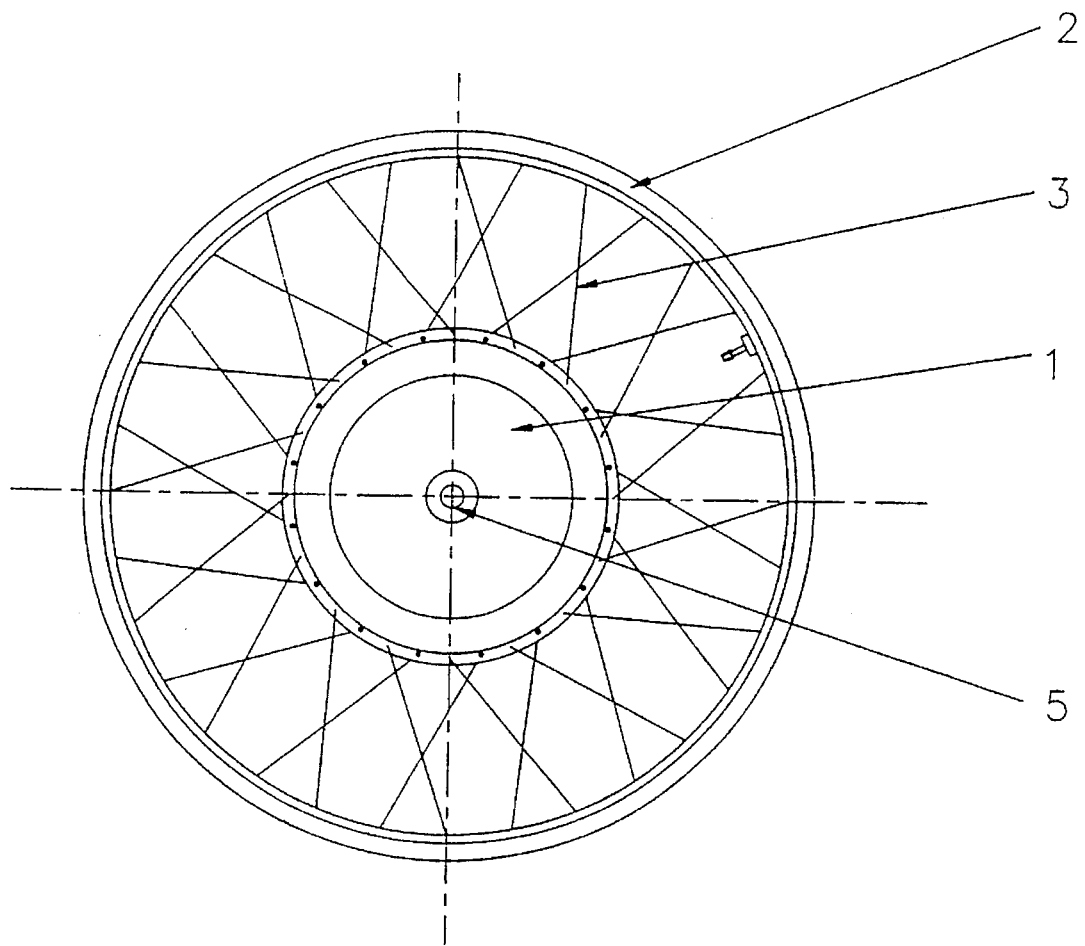
FIG. 1 is a diagrammatic side view of a wheel for a bicycle with a motorized hub, according to the invention.

In FIG. 1 a motorized wheel according to the invention is shown in diagrammatic form, comprising a central hub 1, connected to a rim 2 by means of spokes 3.

In some applications, the rim can be made on the outside of the hub itself, thus eliminating the use of spokes.

The wheel illustrated in FIG. 1 is in particular a metallic bicycle wheel, but it is obvious that it can be made from other materials, for example plastics and that it can be used for other light transport vehicles.

Figure 2:
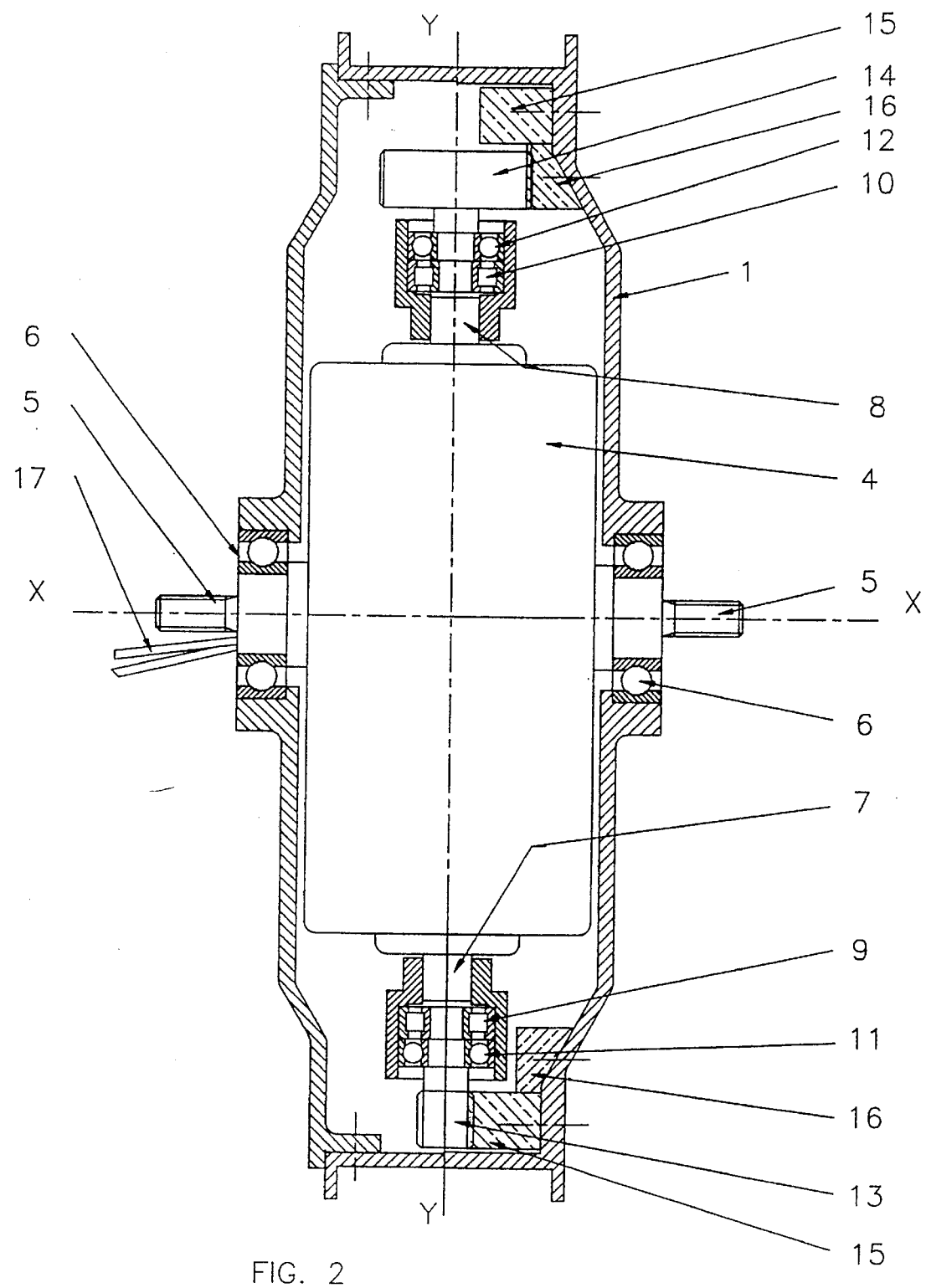
FIG. 2 is a median section of the hub with incorporated electric motor and change-speed gear, according to a first embodiment.

With reference now to FIG. 2, it will be noted that an electric motor 4 is located inside the casing of the hub 1, mounted in a fixed position with respect to the axis X of the wheel, locked to the bicycle fork by means of terminal pins 5. The hub 1 is freely rotatable around the axis X, or around the pins 5, thanks to interposed bearings 6.

Of course, in the case of a bicycle wheel, if it is mounted behind, a freewheel (not shown) will also be mounted on the hub 1, in order to allow traction by means of a chain also, in an already known manner.

According to the invention, the driving shaft, whose axis is shown with Y and is at right angles to the axis X of the wheel, has two diametrically opposed sections 7, 8, projecting from the casing of the motor 4.

By means of a respective freewheel mechanism 9, 10, and related bearings 11, 12, a corresponding pinion 13, 14 in constant mesh with a respective crown wheel or crown gear 15, 16, is connected to each of these sections 7, 8 of the driving shaft. The two crown wheels 15, 16 are preferably applied to the same side of the casing of the hub 1 and have different diameters, and their axes coinciding with the axis X of the wheel.

The two freewheels 9, 10 allow the transmission of the rotary movement of the driving shaft to the respective pinions 13, 14, only when the motor rotates in the correct direction; for example, when the rotation of the driving shaft is right-hand, the pinion 13 transmits the movement and the pinion 14 is free, while when the rotation of the driving shaft is left-hand, the pinion 13 is free once more and the pinion 14 transmits the movement. Whichever pinion transmits the movement, the wheel always turns in the same direction, making the vehicle move forward.

A determined speed reduction ratio, therefore, corresponds to each direction of rotation of the driving shaft. The different speed ratios are, in this case, determined by the different diameters of the pinions 13, 14 and of the corresponding crown wheels 15, 16.

The passing from one ratio to the other obviously takes place by reversing the rotation of the driving shaft, which is brought about immediately just by inverting the feed polarity of the motor, in the case of direct current feed, or by means of an inverter in the case of alternating current feed.

The reversing of rotation can be effected by means of a special control, located for example on the handlebar of the bicycle with which the connection and disconnection of the motor may also possibly be controlled.

In FIG. 2, reference number 17 indicates the feed wires of the electric motor 4, coming from a battery 30, fixed at a convenient point on the bicycle frame not shown.

The reversing of the rotation of the motor, and hence the change of the speed ratio, can be made automatic by means of the electronic circuit 40, on the basis of the current absorbed, by fixing a determined threshold S (not shown). In the starting phase of the vehicle the maximum reduction (pinion 13) is connected, the speed is minimum and there is maximum torque, and therefore current absorption is over the threshold S. As the vehicle gradually takes up speed, the absorbed current decreases, and at the moment when it falls below S, reversing of the rotation of the motor takes place, which causes the pinion 13 to be free, and the larger diameter pinion 14 will transmit the movement, thus reducing the reduction ratio and allowing the vehicle to gain higher speed. When the current absorbed by the motor increases again, for example when going uphill, when the threshold S is crossed, the rotation of the motor is reversed once more, causing the movement to be transmitted again by means of the pinion 13 with maximum reduction.

The value of the threshold S of the current which produces the reversal of the rotation of the driving shaft will be selected on the basis of the different applications of the motorized wheel according to the invention.

If the feed to the motor 4 is disconnected, for example if it is desired to move the vehicle forward with muscular traction alone, both the pinions 13, 14 become free, thus preventing the motor motoring over.

Obviously the motorized wheel according to the invention allows the vehicle to be used with muscular traction only, with electric traction only or with a combination of muscular and electric traction.

In the case of a bicycle, the motorized wheel will preferably be the one at the front, but the motorization may also be applied to the back wheel or even to both the wheels.

From what has been stated above, the advantages of the solution proposed by the invention are easy to see.

It will be noted particularly that the two pinions 13, 14 are always in contact with the respective crown wheels 15, 16, thus eliminating all the drawbacks connected with engaging and disengaging, which are to be found with the already known solution previously described.

A brief description will now be given of the other embodiments of the invention, similar in concept to the one in FIG. 2, and differing from the latter only in some structural parts. In the illustration of such embodiments the reference numbers used in FIG. 2 will be used to designate the same or similar parts.

Figure 3:
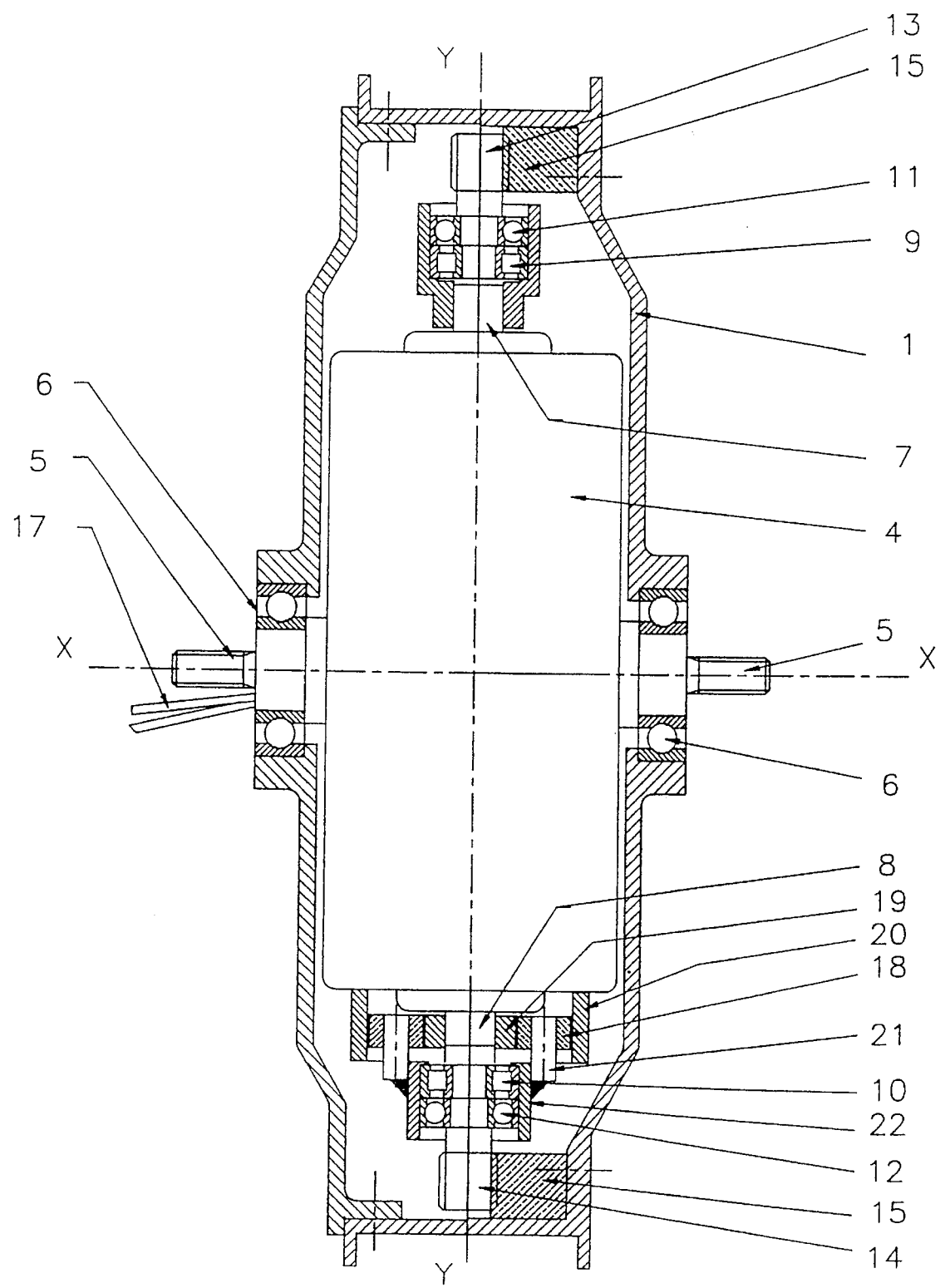
FIG. 3 is a view similar to the one in FIG. 2 of a second embodiment of the change-speed gear, with one of the two pinions connected to the driving shaft by means of epicycloidal gears.
Figure 4:
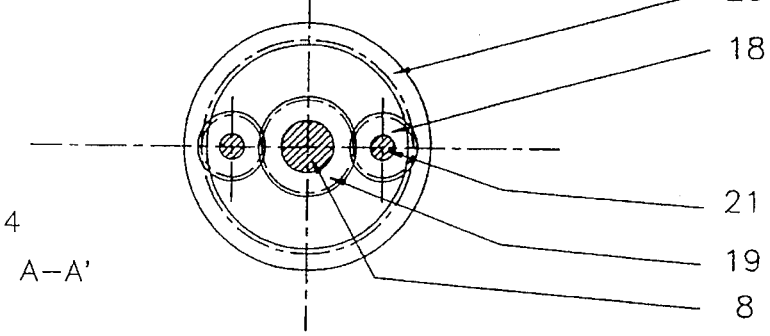
FIG. 4 is a plan view illustrating only the epicycloidal gears.

The embodiment according to FIGS. 3 and 4 differs from the one in FIG. 2 only in that one of the two pinions, precisely the lower one 14 with reference to the figure, receives its movement from the driving shaft by means of epicycloidal gears 18, which engage with a crown wheel 19 splined onto the corresponding section 8 of the driving shaft, and housed in a cylindrical box 20 integral with the casing of the motor 4. The shafts 21 however of the epicycloidal gears 18 are made integral with a cylindrical casing 22, containing the free wheel mechanism 12 and the bearings 11, for the transmission of the rotary movement to the pinion 14, which in this case has the same diameter as the pinion 13, in such a way that both pinions 13, 14 can engage at the same time with the same crown wheel 15.

In this embodiment, the maximum reduction ratio is found in correspondence with the epicycloidal unit.

Figure 5:
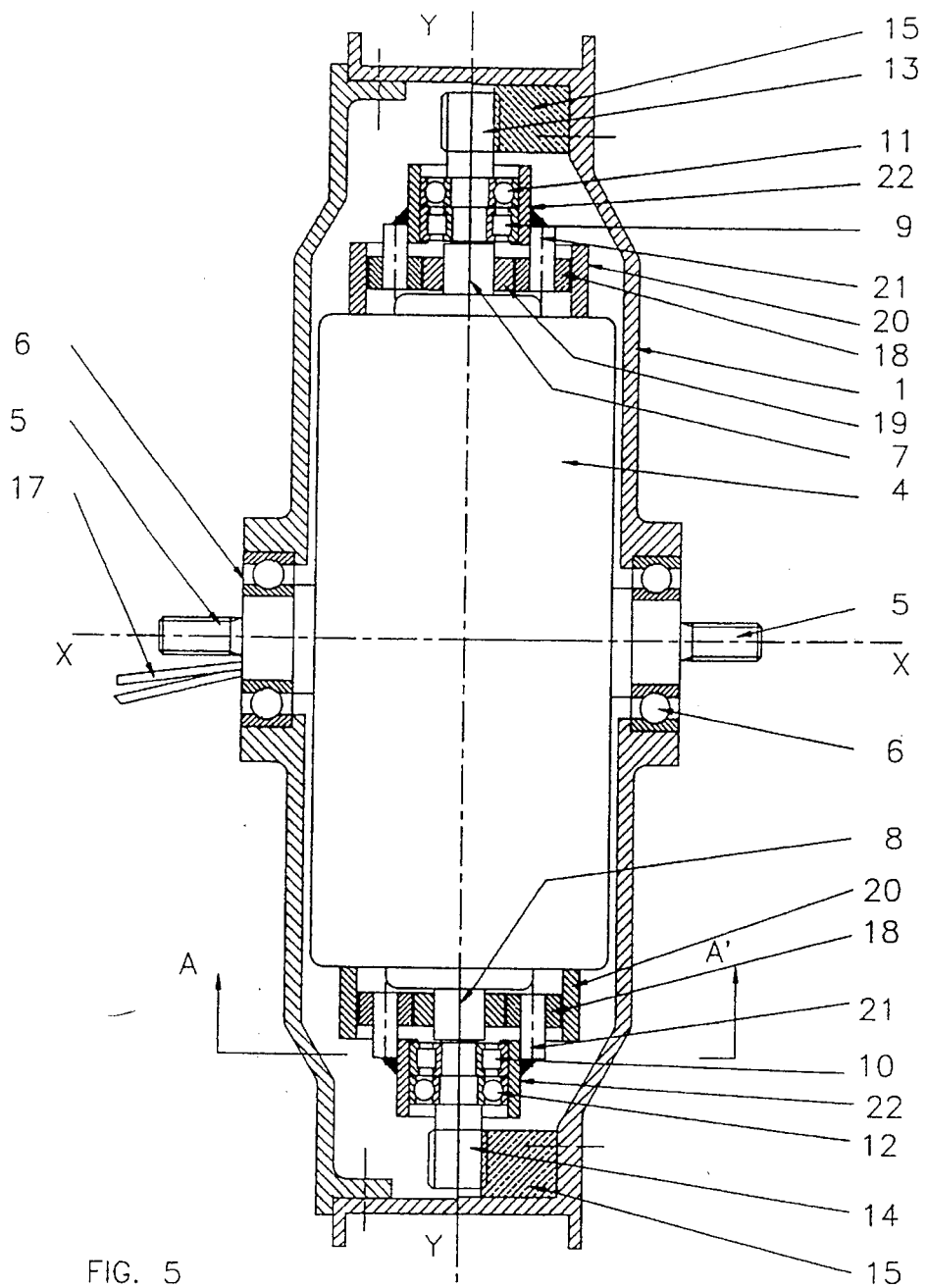
FIG. 5 is a view similar to the one in FIG. 2, illustrating a third embodiment of the change-speed gear, with both the pinions connected to the driving shaft by means of epicycloidal gears.

According to the embodiment illustrated in FIG. 5, both pinions 13, 14 are connected to the respective sections 7, 8 of the driving shaft by means of epicycloidal units with different reduction ratios. In such figure, the same reference numbers have been used for the two epicycloidal groups as those used in FIGS. 3 and 4.

Figure 6:
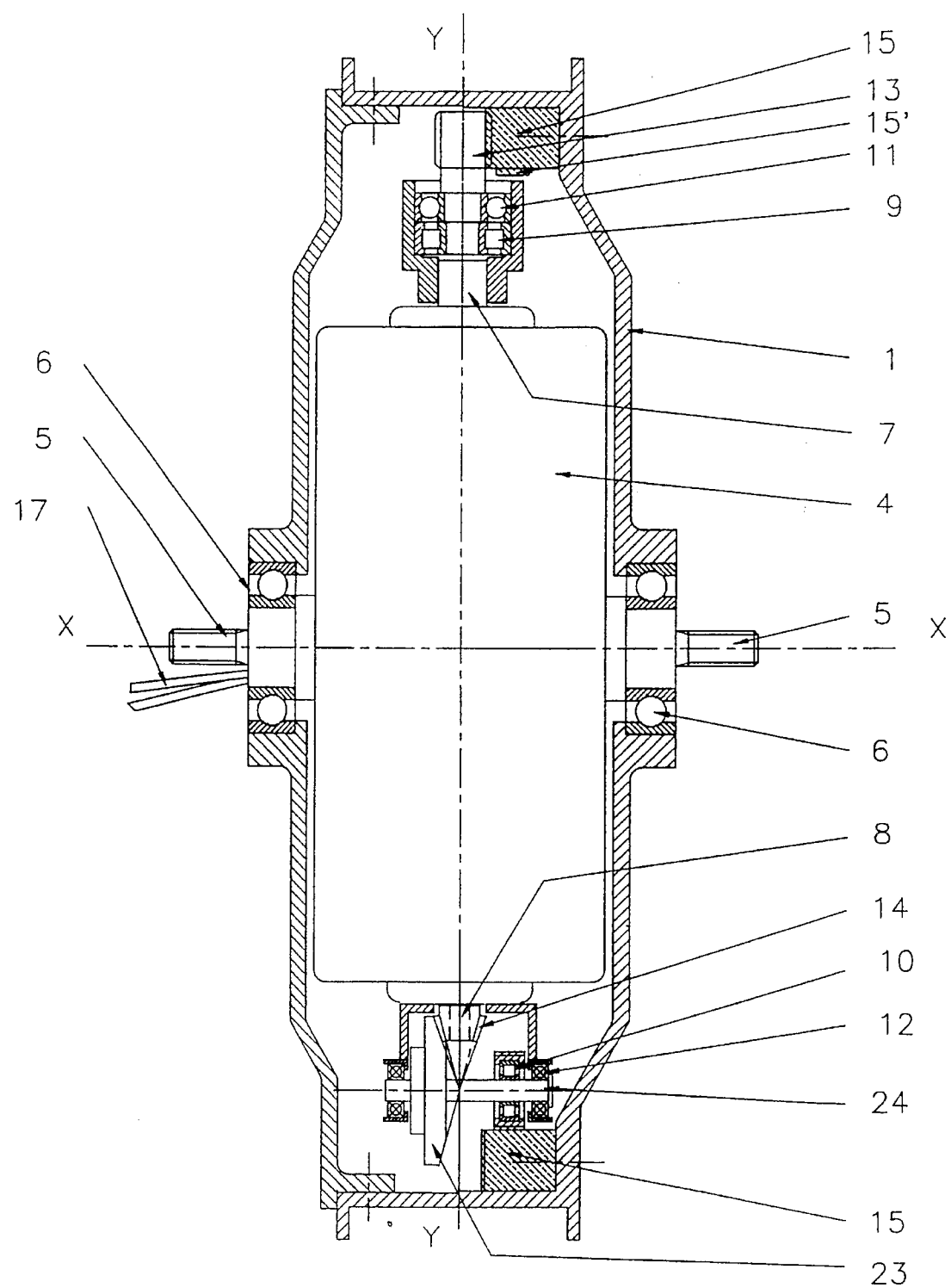
FIG. 6 is a view similar to the one in FIG. 2, illustrating a fourth embodiment of the change-speed gear according to the invention, using a bevel gear pair.

According to the embodiment in FIG. 6, the pinion 14 is a bevel pinion splined directly onto the section 8 of the driving shaft and engages with a corresponding bevel gear 23, whose shaft 24, which is at right angles to the axis Y of the driving shaft and parallel to the axis X of the wheel, operates, by means of the freewheel mechanism 10, a pinion outside the same freewheel, which engages with the crown wheel 15, which has an inner toothing 15' as well as a lateral toothing.

In this case, the higher reduction ratio is found in correspondence with the bevel gear pair.

Figure 7:
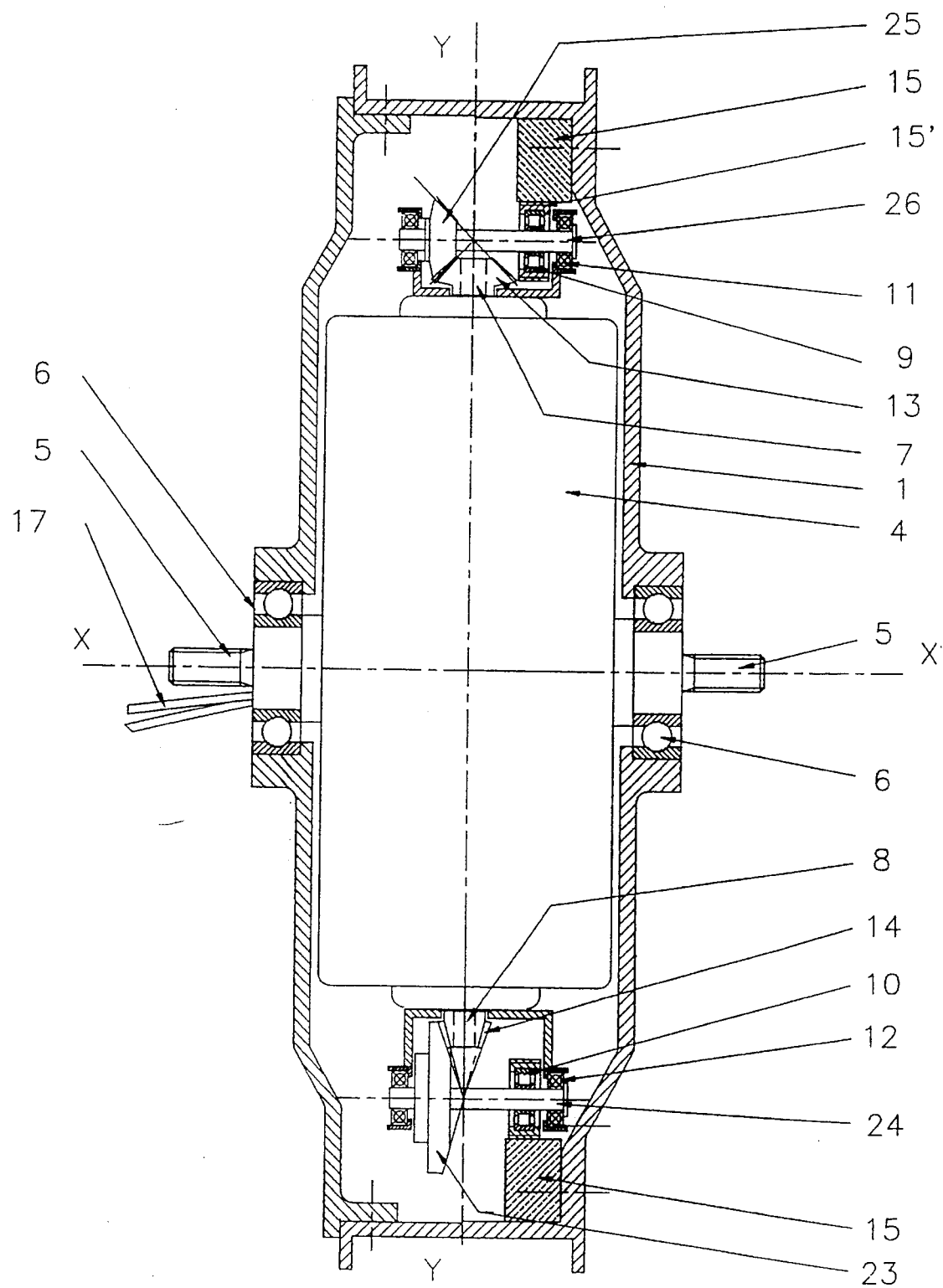
FIG. 7 is a view similar to the one in FIG. 2, illustrating a fifth embodiment of the change-speed gear according to the invention, using a bevel gear pair.

Finally, according to the embodiment in FIG. 7, the bevel gear pairs are foreseen, with different ratios, in correspondence with both sections 7, 8 of the driving shaft, for transmitting movement to the crown wheel 15, by means of the freewheel mechanism 9, 10, with pinions outside the same freewheels. In such figure, the bevel gear which engages with the bevel pinion 13 is shown with 25, and its shaft, which is parallel to the shaft 24 of the bevel gear 23, is shown with 26.

I claim:

1. A motorized wheel for vehicles comprising:

a hollow central hub rotatably mounted on an axis of rotation;

a reversible electric motor having a casing, mounted within the hub and being fixedly mounted with respect to the axis of rotation and including a pair of rotatable drive shafts having opposite extending sections mounted for reversible rotation in opposite directions on a motor axis perpendicular to the axis of rotation of the hub;

a crown gear mounted to the hub about the axis of rotation;

a mechanical change-speed gear for each of the sections of the drive shaft coupled between the drive shaft of the motor and the crown gear for driving the hub in a first direction in accordance with corresponding opposite rotational directions of the respective shaft sections;

a free wheel mechanism for each drive shaft section coupled between the change-speed gear and the drive shaft of the motor for free wheeling the mechanical change-speed gear when the rotation of the wheel is different from the corresponding direction of the drive shaft sections for driving the wheel in said first direction; and at least one reduction gear means located between the drive shaft and the change-gear mechanism for allowing operation of the hub in at least two gear ratios.

2. A motorized wheel according to claim 1 including a pinion secured to each section for engaging the crown gear and wherein each of the said pinions has a different diameter.

3. A motorized wheel according to claim 2 further comprising a further crown gear mounted concentrically with respect to first crown gear and wherein each of the pinions engages the first crown gear and the further crown gear respectively.

4. A motorized wheel according to claim 1 wherein at least one of the sections of the drive shaft includes a bevel gear pair which engages said crown gear.

5. A motorized wheel according to claim 1 further including a countershaft interposed between said free wheel mechanism and said crown gear including pinions outside the free wheel mechanism.

6. A motorized wheel according to claim 1 wherein respective bearings are associated with each free wheel mechanism.

7. A bicycle including at least one motorized wheel according to claim 1.

8. A motorized wheel according to claim 1, wherein the motor drive shaft has rotatable free ends and further comprising a pinion for each free end of the motor drive shaft coupled to the free wheel mechanism, each of said pinions engaging the crown gear.

9. A motorized wheel according to claim 1 wherein the reduction gear means comprises an epicycloidal gear engaging with the crown gear and being splined onto a free end of the drive shaft.

10. A motorized wheel according to claim 1 wherein the motor casing includes a housing portion for the motor and an integral gear box portion for the reduction gear means.

11. A motorized wheel according to claim 1 wherein the free wheel mechanism includes a housing and the reduction gear means includes support shaft means integral with the housing.

12. A motorized wheel according to claim 1 further comprising a further crown gear mounted concentrically with respect to the first crown gear.

13. A motorized wheel for a bicycle comprising:

a hollow central hub having opposite shaft openings and being rotatable about a hub axis passing through said shaft openings;

an electric motor located in the hub including a housing and shaft members extending from the housing in opposite directions and secured in the shaft openings along the axis, said hub being rotatable with respect to the motor;

a pair of motor drive shafts operatively coupled to the motor and extending from the housing about a motor axis perpendicular to the hub axis, said shafts being reversibly rotatable by said motor in opposite directions;

a crown gear mounted within the hub in radial spaced relationship with the hub axis;

means for connecting the crown gear with the motor drive shafts including a gear for each motor drive shaft and a freewheel mechanism located between the gear and the motor drive shaft and at least one reduction gear means on one of said motor drive shafts between the freewheel mechanism and the motor, each of said freewheel mechanisms being rotatable in a direction by the corresponding drive shaft for driving the wheel in a first direction and being freewheeling with respect to the corresponding drive shaft when rotated in an opposite direction so that the wheel is drivable in said first direction at different gear ratios upon operation of the motor in opposite directions.

* * * * *